April 21, 1970 P. F. O'DRISCOLL 3,507,634
COMPOSITE METAL STRUCTURE

Filed Oct. 22, 1965 2 Sheets-Sheet 1

PETER F. O'DRISCOLL
INVENTOR.

BY
ATTORNEY

PETER F. O'DRISCOLL
INVENTOR.

BY
ATTORNEY

United States Patent Office 3,507,634
Patented Apr. 21, 1970

3,507,634
COMPOSITE METAL STRUCTURE
Peter F. O'Driscoll, Los Altos, Calif., assignor to United Aircraft Corporation, East Hartford, Conn., a corporation of Delaware
Filed Oct. 22, 1965, Ser. No. 500,698
Int. Cl. B32b 15/00, 1/02; B64c 1/00
U.S. Cl. 29—191.4     5 Claims

ABSTRACT OF THE DISCLOSURE

A structural metal sandwich comprising a planar metal sheet welded to a second sheet having a plurality of spaced distortions distributed thereacross, each of the distortions having a top surface substantially parallel to said planar sheet, which top surface is the situs of the weld and side surfaces provided with a plurality perforations therein. In addition, a metal filler may be interposed between the two sheets to permit the forming of the sandwich structure into complex shapes. The metal filler is of a dissimilar metal from the sandwich structure and is soluble in a solvent which will not affect the metal of the sandwich structure. The perforations permitting the ready removal of the filler by leaching.

BACKGROUND OF THE INVENTION

This invention relates to composite metal structures and methods of manufacturing the same, and, more particularly, to a composite metal structure capable of withstanding both tension and compression loads.

In the aircraft and space industry, there exists a need for composite metal structures of structural materials having high strength to weight ratios. These materials are used in formation of various elements of aircraft and space vehicles such as the wings and body assemblies and also can be used in the fabrication of pressurized containers such as, for example, the liquid fuel tanks of a liquid rocket motor. The elements of the composite metal structure must, of course, be strongly bonded together so that separation of the various components does not occur during use and so that the structure can be capable of withstanding the various loads which will be applied thereto. It is also essential that the composite structure be capable of being formed into various shapes and configurations without destruction of the structural integrity of the components of the structure.

U.S. Patent No. 3,044,160, July 17, 1962, R. I. Jaffee, discloses a composite metal structure having some of these desired properties. The sandwich structure of the Jaffee patent consists of a top and bottom sheet of a structured metal, such as titanium, separated by and welded to ribs of titanium which extend the length of the material. The composite is formed by laying down a base sheet of titanium and then building up the core by laying down the titanium ribs and placing a filler material of mild steel or copper between the ribs. The top sheet is then placed over this laid up core structure and the composite structure is then hot-rolled to weld the ribs to the top and bottom sheets and to reduce the thickness of the structure. The finished metal structure is then produced by leaching or otherwise removing the metal filler from the sandwich. The disadvantages of the Jaffee process are obvious in that it requires a hand lay up of the original structural composite before welding and the removal of the filler material is rather difficult. The material produced also has anisotropic properties because the resistance to bending in a direction transverse to the ribs is greater than in a direction parallel to the ribs. According to this invention, however, a novel composite metallic structure is produced having a high strength-to-weight ratio combined with ease of fabrication and the ability to produce an end product having isotropic or anisotropic characteristics as desired.

It is accordingly a primary object of this invention to provide a novel composite metallic structure.

It is another primary object of this invention to provide a novel method for manufacturing this composite metallic structure.

It is another object of this invention to provide a composite metal structure having a high strength-to-weight ratio.

It is another object of this invention to provide a composite metal structure which is readily formed into complex shapes.

It is another object of this invention to provide a composite metal structure particularly suitable for use as a pressure vessel wall.

These and other objects of the invention will be readily apparent from the following disclosure with reference to the accompanying drawings wherein.

DESCRIPTION OF THE INVENTION

Figure 1:
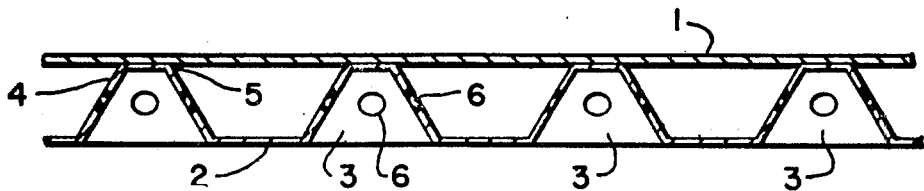
FIGURE 1 is a cross section view of one embodiment of the composite metal structure according to this invention.
Figure 2:
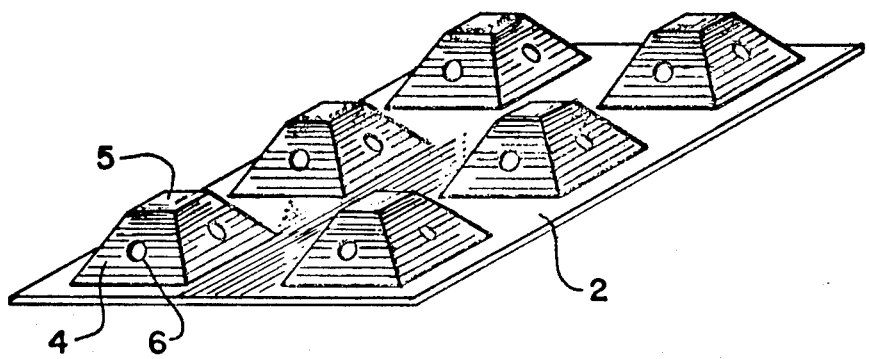
FIGURE 2 is a perspective view of one sheet of the composite structure.

Referring now to FIGURE 1, the composite structure according to this invention consists of a substantially planar sheet 1 and a deformed sheet 2. Sheet 2 has a series of spaced cells 3 defined by side surface 4 and top surface 5 distributed about the surface thereof. The particular configuration of each cell is shown in FIGURE 1 as being a truncated pyramide with a square base and the cells are evenly distributed across the surface of sheet 2. In such an embodiment, the final composite structure will have isotropic properties. The cells, however, could be of other configurations, such as truncated conical shape, if desired. Also, if it is desired to produce a finished composite structure which has anisotropic properties, the cells could have a base portion which is rectangular or rhomboidal in shape rather than square as shown herein and further, the distribution of the cells along the surface of the material could be selected to produce physical characteristics greater in one direction than in another. Sheets 2 and 3 are welded together at top surface 5 and side walls 4 of individual cells 3 are provided with orifices 6, the function of which will be described later. The structural composite can be made from any suitable structural metal such as titanium, titanium alloys, stainless steels, aluminum alloys, columbium alloys, and molybdenum alloys, for example. In order to fabricate the structural composite shown in FIGURE 1, the deformed sheet 2 is produced by roll-forging an initially flat sheet by passage between mating roll-forging dies to produce the configuration shown in FIGURE 2. A filler material 11 which may be mild steel, copper or other materials which are soluble in solvents to which the structural material is resistant and capable of withstanding the processing conditions, is heated to the softening point and then filled into sheet 2 in the spaces between the cells 3 by passing the sheet 2 and the filler material 11 between cooperating rolls 6 and 7. One of the rolls 7 has spaced protrusions 8 adapted to engage and fill the cells 3 of skin 2 to support the cells and prevent the filler material from entering into the cells through openings 6. The sheet with the filler material is then passed between another series of rollers 9 and 10, one of which is similar to roller 7 and the top sheet 2 is applied to the sandwich structure and welded thereto by the application of sufficient heat and pressure by rollers 9 and 10. If desired, the steps of adding the filler material and roll welding the planar sheet to the base sheet can be combined into one operation. If titanium is the metal, for example, it is necessary to heat the metal up to at least approximately 1400° F. and apply sufficient pressure to reduce the thickness of the metal at the point of contact by about 60% in order to insure proper welding of the surfaces. Oxidation is a problem in roll welding process, and, in order to eliminate weld failure due to the oxidation of the metal surfaces, the process should be carried out in an inert or nonoxidizing atmosphere. When metals other than titanium are used, the temperature, pressure, and atmosphere requirements will, of course, be different from those required with titanium. The specific conditions required for other materials is readily determinable within existing welding technology.

Figure 4:
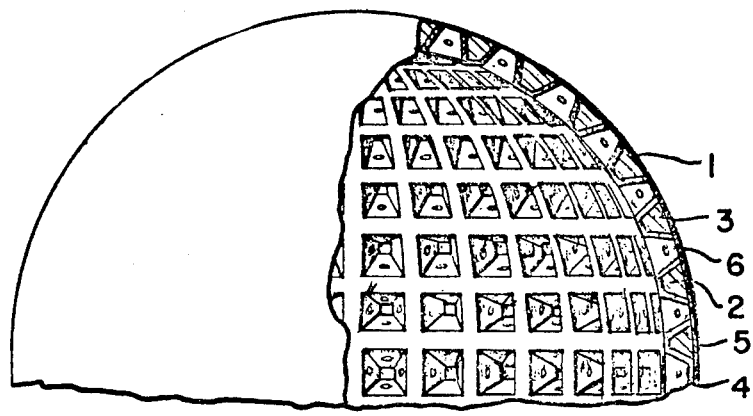
FIGURE 4 is a perspective view, partly broken away, of a hemispherical vessel closure formed according to this invention and, FIGURE 5 is a plan view, partly broken away, of an embodiment of this invention.

The composite structure with the filler material in it may subsequently be cold or hot formed into any desired configuration and the filler material will act to prevent deformation of the individual cell structures. Thus, it is possible to produce relatively sharp bends in the sandwich structure and to form it into complex configurations. For example, in FIGURE 4, the composite structure with the filler has been hot forged into a hemispherical form suitable for use as a closure member of a pressure vessel. The filler material acts to distribute the forces applied in the forging process and enables the composite structure to maintain its integrity. Various forming processes are available to the art and include both hot and cold forming processes such as, for example, roll forming, spin forming, and explosive forming. The particular process for a particular configuration can be readily selected by the worker in the art. As a general rule, hot forming processes are desired if configuration having small radii of curvatures are envisioned or if distortions in more than one direction are required. After the composite structure has been formed into its final shape, the filler is removed by leaching the filler material with a material that is not a solvent or reactive with the structural sheets. For example, if titanium is the metal forming sheets 1 and 2 and cold steel or copper is the metal filler material, the filler may be removed by leaching with nitric acid. In this situation, the material may be immersed in a bath of acid and the acid will not only be able to act on the filler material from the edges of the composite structure but will also flow to the metal through the holes 6 provided in walls 5 of the cell structures.

Figure 3:
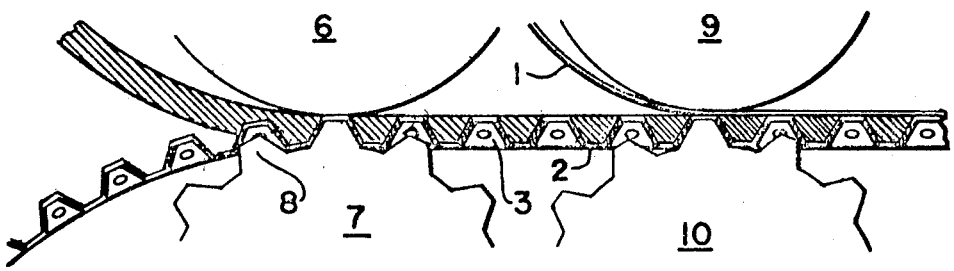
FIGURE 3 is a semischematic view showing the formation of the composite structure.

In certain applications, such as when the composite structural material is formed into a pressure vessel or any other container, for example, the size of the vessel need not be controlled by the available size of a leaching bath. In such a situation, it would only be necessary to fill the container with the leaching solution and if the sheet 2 formed the internal surface of the container, the filler material could be leached in situ. Another advantage of this particular structure for use in pressure vessels and tanks containing fluid is that when sheet 2 forms the internal surface of the pressure vessel, the cells and their intercommunicating holes act as effective antislosh elements. It is readily apparent that if the composite metal structure is to be formed into various shapes after it is assembled, the filler material is necessary. However, if the composite can be utilized in a flat sheet, the softer material need not be added and the roll welding process of FIGURE 3 can be carried out without the addition of the filler material. In that case, it is also not necessary to provide holes 5 in the side walls of cells 3. The composite metal structure of this invention aside from the ease of fabrication and the high strength-to-weight ratios attainable and the ability to obtain isotropic or anisotropic characteristics of the final product, also allows for control cables and electrical conduits to be laid through the structure in different directions without disrupting the structural integrity of the walls. Also, the welds are readily inspectable and this feature is of great importance in the particular area of use in the aerospace and aircraft industries.

Figure 5:
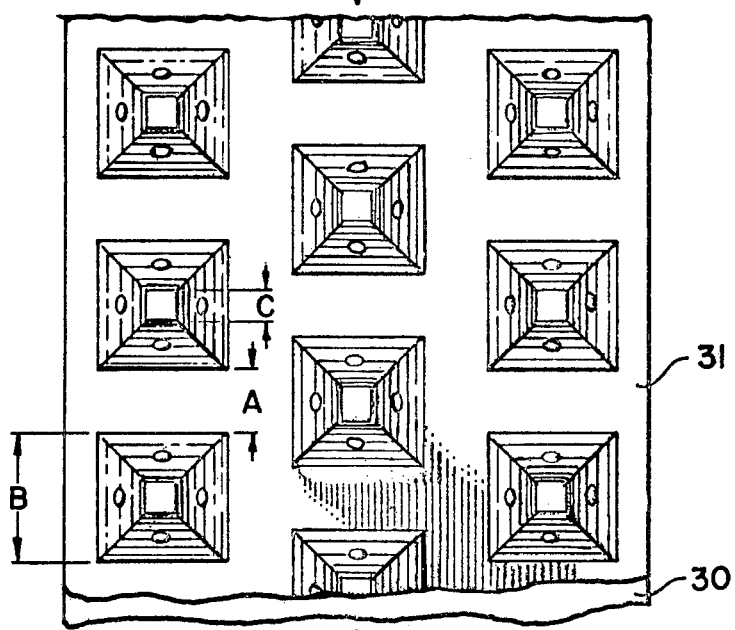

A typical example of a metal structure according to this invention is shown in FIGURE 5. In the illustrated form, alternate rows of cells are offset to improve the resistance to the directional compressive force shown by the arrows. The base sheet 30 is formed of 0.015" titanium sheet and the deformed sheet 31 is formed from 0.030" titanium sheet. The total thickness of the finished composite is 0.50". The dimensions $a$, $b$, and $c$ are equal to 0.25", 0.50", and 0.125", respectively. The diameter of the spaced perforations is about 0.10". In fabricating the structure, sheet 31 is roll forged and a mild steel filler added. The sheet 31 is welded to sheet 30 by heating the structure in an inert atmosphere to a temperature of 1400° F. and by exerting sufficient pressure on the abutting surfaces to reduce their combined thicknesses from about 0.045" to about 0.018". The filler is removed by leaching in nitric acid.

While this invention has been described with respect to various specific embodiments thereof, the invention should not be construed as being limited thereto. This invention includes all obvious modifications and substitutions and is limited only by the scope of the following claims wherein:

I claim:
1. A composite metal structure comprising a first sheet having a contiguous surface and a second sheet having spaced distortions distributed across the surface thereof, each said distortion comprising a side surface provided with at least one perforation and a top surface substantially parallel to the surface of said second sheet, said top surfaces being securely bonded to said first sheet and a metallic filler disposed between said first and second sheets and substantially filling the spaces between said distortions, said metallic filler being soluble in a solvent which will not dissolve the metal of said first and second sheets.

2. The composite metal structure of claim 1 wherein said distortions are uniformly distributed across said second sheet.

3. The composite metal structure of claim 1 wherein said distortions comprise a top surface in the form of a regular polygon and said side surface comprises adjacent surfaces in the form of identical polygons equal in number to the number of sides of said regular polygon.

4. The composite metal structure of claim 2 wherein said distortions comprise a top surface in the form of a regular polygon and said side surface comprises adjacent surfaces in the form of identical polygons equal in number to the number of sides of said regular polygon.

5. The composite metal structure of claim 3 wherein said first and second sheets consist of a metal selected from the group consisting of titanium, titanium alloys, stainless steel, aluminum alloys, columbium alloys, and molybdenum alloys.

References Cited

UNITED STATES PATENTS

| | | | |
|---|---|---|---|
| 2,391,997 | 1/1946 | Noble | 52—578 |
| 3,044,160 | 7/1962 | Jaffee | 29—423 |
| 3,256,669 | 6/1966 | Seiwert | 52—615 |
| 2,132,642 | 10/1938 | Parsons | 52—618 X |
| 2,828,235 | 3/1958 | Holland et al. | 52—618 X |
| 3,011,602 | 12/1961 | Ensrud et al. | 244—123 X |
| 3,017,971 | 1/1962 | Christman | 52—618 X |
| 3,084,770 | 4/1963 | Wirsing | 52—618 X |
| 3,309,042 | 3/1967 | Edwards | 244—123 X |

L. DEWAYNE RUTLEDGE, Primary Examiner

E. L. WEISE, Assistant Examiner

U.S. Cl. X.R.

52—618; 244—123